April 12, 1966   H. COHN   3,246,212
ELECTROLYTIC CAPACITOR AND ELECTROLYTE THEREFOR
Filed March 7, 1962
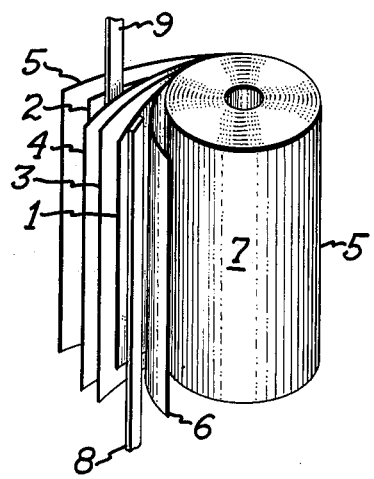
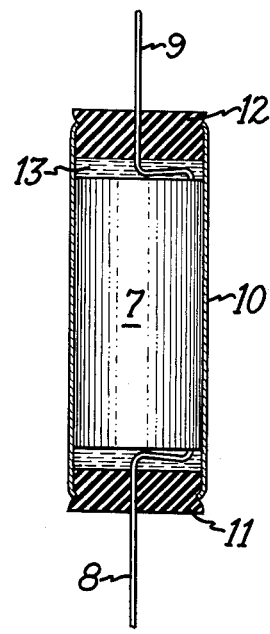
Inventor,
Hans Cohn,
by Sidney Grunberg
His Attorney.

United States Patent Office 3,246,212
Patented Apr. 12, 1966

3,246,212
ELECTROLYTIC CAPACITOR AND ELECTROLYTE THEREFOR
Hans Cohn, Columbia, S.C., assignor to General Electric Company, a corporation of New York
Filed Mar. 7, 1962, Ser. No. 178,155
9 Claims. (Cl. 317—230)

The present invention relates to electrolytic capacitors, and more particularly to an improved fill electrolyte therefor.

It is an object of the present invention to provide an electrolytic capacitor having a high degree of stability and improved life characteristics under operating conditions of high voltage and a wide temperature range.

It is another object of the invention to provide an electrolytic capacitor which is operable over a temperature range of about −55° C. to 125° C. and has minimum change in capacitance and resistance over that range.

It is a particular object of the invention to provide a substantially nonaqueous fill electrolyte which confers the above improved characteristics to electrolytic capacitors and which is especially suited for use with non-polar capacitors as well as for polar capacitors.

Other objects and advantages will become apparent from the following description and the appended claims.

With the above objects in view, the present invention relates to an electrolytic capacitor which comprises an electrode of film-forming metal, and an electrolyte comprising principally dimethylformamide having dissolved therein oxalic acid and ammonium oxalate.

The invention will be better understood from the following description taken in conjunction with the accompanying drawing in which:

FIGURE 1 shows an electrolytic capacitor assembly of rolled type in which the invention may be embodied; and FIGURE 2 shows the capacitor assembly of FIGURE 1 arranged in a case.

Referring now to the drawing, and in particular to FIGURE 1, there is shown a partially unrolled capacitor roll body of conventional construction comprising a pair of electrode foils 1 and 2, at least one of which is made of tantalum or other suitable film-forming metal, which may be advantageously, although not necessarily, etched and has a dielectric oxide film thereon, the foils in the operation of the capacitor having opposite polarity. In a polar type capacitor, normally only the electrode serving as the anode will have a dielectric oxide film formed thereon. In a non-polar capacitor, both electrode foils will have dielectric oxide films formed thereon. The dielectric oxide film may be produced by film-forming (usually anodizing) processes well known in the electrolytic capacitor art. Between foils 1 and 2 are sheets of dielectric spacer material 3, 4, 5, and 6 composed conventionally of cellulosic material such as kraft paper, or other suitable material of a permeable porous impregnatable nature. Terminals or tap straps 8 and 9 are secured to the respective foils and extend in opposite directions. The electrode foils and dielectric sheets are wound into a compact roll 7 prior to insertion into a casing, as shown in FIGURE 2.

FIGURE 2 shows the capacitor roll assembly 7 enclosed in a metal casing 10 with terminals 8 and 9 extending respectively through plugs or discs 11, 12 of insulating material, such as a synthetic resin, providing a fluid-tight seal for the interior of the casing. Electrolyte 13 of the composition more fully described hereinafter fills casing 10 and impregnates the porous spacer material.

While a rolled foil type of electrolytic capacitor is shown, it will be understood that other types of electrolytic capacitors employing liquid electrolyte, such as slug, wire, or other well known types of capacitors, may embody the present invention for obtaining similar benefits.

The electrolyte of the present invention is composed principally of N,N-dimethylformamide, and ionogens dissolved therein composed of ammonium oxalate and oxalic acid. Generally, the ionogens will be present in small amounts and ordinarily an amount of ammonium oxalate is employed which will not precipitate at −55° C.

A preferred electrolyte composition which may be used as electrolyte 13 is the following in percent by weight:

|  | Percent |
| --- | --- |
| N,N-dimethylformamide | 97.0–98.95 |
| Oxalic acid | 1.0 |
| Ammonium oxalate | .048–0.10 |
| Water | Up to 1 |

The above electrolyte is preferably prepared by dissolving 1% by weight of oxalic acid in the N,N-dimethylformamide, and then adding about 0.75 grams of ammonium carbonate per liter of dimethylformamide, such that the resistivity of the solution approximates 2,000 ohms-centimeters and the pH is about 4 to 5.

Instead of adding ammonium carbonate, sufficient ammonia gas may be passed through the solution to produce the desired amount of ammonium oxalate by reaction with the oxalic acid.

In either case, a reaction takes place between the oxalic acid and the ammonium-containing component to form ammonium oxalate and a trace amount of water.

While the above-described proportions of the ingredients are preferred, the amounts may be somewhat varied and still provide satisfactory results. In general, the N,N-dimethylformamide may be present in a range of about 89–99% by weight, the oxalic acid in a range of about 0.1 to 10% by weight, and the ammonium oxalate in a range of about 0.01 to 0.1% by weight. While excess amounts of the latter do not make the electrolyte inoperative for the purposes of the invention, amounts over the indicated limit do not normally dissolve in the electrolyte solution. The use of ammonium oxalate initially in preparing the solution is not as convenient as employing ammonium carbonate or ammonia gas as above-described, since ammonium oxalate very slowly dissolves in the dimethylformamide.

The electrolyte composition of the invention is well-suited for use as a fill electrolyte for tantalum foil capacitors at high voltages, e.g., 350 volts D.C. at 25° C. and 300 volts D.C. at 125° C. A particularly significant feature of the electrolyte is its property of maintaining the formed dielectric oxide film on the electrode foil at the formed voltage under operating conditions, especially under those that require an occasional or periodic change of direct current polarity, or temporary or continuous operation at alternating current potentials. The electrolyte is thus well adapted for use in non-polar capacitors.

Moreover, the described electrolyte has exceptional compatibility with the dielectric sheets, and has the ability to impregnate kraft and other capacitor paper of cellulose composition as well as other materials such as glass tissue. In addition, its low viscosity and relatively small increase in resistance at −55° C. results in excellent low temperature capacitor characteristics. It has also been noted that there is good stability of the electrolyte and of the tantalum oxide film in contact therewith even at elevated operating temperatures of up to 125° C.

Another advantage in the use of the described electrolyte is that the oxalates of many metals are insoluble, as compared, for example, to the nitrates of the same metals. Thus, impurities in the form of such metals found in the electrode foils, for example, would be precipitated and removed from the described electrolyte, but would remain soluble in the nitrate containing electrolytes of known type.

In tests conducted in connection with the invention, bare tantalum foil was anodized in the preferred electrolyte to a D.C. voltage of 480 volts to establish the film-forming and film-maintaining capability of the electrolyte. This value is approximately 200 volts higher than the value obtainable with electrolytes having other ionogens, such as ammonium formate and ammonium nitrate in dimethylformamide. The advantage thus afforded is that capacitors of this invention may be subjected to higher operating voltages than previous types of capacitors, and at lower voltages the film-maintaining properties of the electrolyte are better than those of known electrolytes.

At low voltages it has been determined that the preferred electrolyte of this invention has the unique ability of suppressing the maximum current arising from periodic reversal of polarity, to a level below that obtained with other ionogens, for example, ammonium nitrate in dimethylformamide.

Test data on the electrolyte of this invention obtained at operating voltages (for example, 250 volts D.C.) confirms the current suppression phenomenon observed at lower voltages.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What I claim as new and desire to secure by Letters Patent of the United States is:

1. An electrolytic capacitor comprising a pair of electrodes at least one of which is composed of a film-forming metal and has a dielectric oxide film thereon, and an electrolyte comprising a predominant amount of N,N-dimethylformamide, about .10 to 10% oxalic acid, and a sufficient amount of ammonium oxalate dissolved in said dimethylformamide and oxalic acid which will remain in solution at about −55° C.

2. An electrolytic capacitor comprising a pair of electrodes at least one of which is composed of a film-forming metal and has a dielectric oxide film thereon, and an electrolyte comprising N,N-dimethylformamide having dissolved therein about 0.10 to 10% by weight of oxalic acid and 0.01 to 0.1% by weight of ammonium oxalate.

3. An electrolytic capacitor comprising a pair of electrodes at least one of which is composed of a film-forming metal and has a dielectric oxide film formed thereon, and an electrolyte between said electrodes comprising about 89 to 99% by weight of N,N-dimethylformamide, about 0.1 to 10% oxalic acid, about 0.01 to 0.1% by weight of ammonium oxalate, and about .012 to 1.0% by weight of water.

4. An electrolytic capacitor comprising a pair of electrodes both of which are composed of film-forming metal and having a dielectric film formed thereon, and an electrolyte between said electrodes comprising about 89 to 99% by weight of N,N-dimethylformamide, about .10 to 10% oxalic acid, about .01 to .1% by weight of ammonium oxalate, and about .012 to 1.0% by weight of water.

5. An electrolytic capacitor comprising a pair of electrodes both of which are composed of tantalum and each having a tantalum oxide dielectric film formed thereon, and an electrolyte between said electrodes comprising about 89 to 99% by weight of N,N-dimethylformamide, about .1% to 10% oxalic acid, about .01 to .1% by weight of ammonium oxalate, and about .012 to 1% by weight of water.

6. An electrolytic capacitor comprising a pair of electrodes both of which are composed of tantalum and each having tantalum oxide dielectric film thereon, permeable dielectric spacer material arranged between said electrodes, and an electrolyte between said electrodes permeating said spacer material, said electrolyte comprising about 89 to 99% by weight of N,N-dimethylformamide, about .10 to 10% oxalic acid, about .01 to 1% by weight of ammonium oxalate, and about .012 to 1% by weight of water.

7. An electrolytic capacitor comprising a pair of electrodes both of which are composed of film-forming metal and having a dielectric film formed thereon, permeable dielectric spacer material composed of kraft paper arranged between said electrodes, and an electrolyte between said electrodes permeating said spacer material, said electrolyte comprising about 89 to 99% by weight of N,N-dimethylformamide, about .01 to .1% by weight of ammonium oxalate, about .10 to 10% oxalic acid, and about .012 to 1.0% by weight of water.

8. A liquid electrolyte for electrolytic capacitors comprising about 89 to 99% of N,N-dimethylformamide, about .1 to 10% of oxalic acid, about .01 to .1% of ammonium oxalate and about .012 to 1% of water.

9. A liquid electrolyte for electrolytic capacitors comprising a solution containing about 98% N,N-dimethylformamide, about 1% oxalic acid, about .05% ammonium oxalate, and about 1% water.

References Cited by the Examiner

UNITED STATES PATENTS

| | | | |
|---|---|---|---|
| 1,270,784 | 7/1918 | Chubb | 317—230 X |
| 2,945,164 | 7/1960 | Taylor | 317—230 |
| 2,965,690 | 12/1960 | Petersen et al. | 317—230 |
| 2,994,809 | 8/1961 | Jenny et al. | 317—230 |

JOHN W. HUCKERT, *Primary Examiner.*

JAMES D. KALLAM, *Examiner.*